United States Patent [19]

Dewey

[11] 4,312,852
[45] Jan. 26, 1982

[54] NITRIC ACID RECONSTITUTION

[75] Inventor: John L. Dewey, Little Rock, Ark.

[73] Assignee: Reynolds Metals Company, Richmond, Va.

[21] Appl. No.: 175,925

[22] Filed: Aug. 6, 1980

Related U.S. Application Data

[63] Continuation-in-part of Ser. No. 61,298, Jul. 27, 1979, abandoned.

[51] Int. Cl.$^3$ ............................................. C01B 21/42
[52] U.S. Cl. ..................................................... 423/393
[58] Field of Search ................................. 423/393, 394

[56] References Cited

U.S. PATENT DOCUMENTS 1,939,162 12/1933 Caro et al. .......................... 423/393
2,776,189 1/1957 Winn ................................... 423/394
3,716,625 2/1973 Oberste-Berghaus .............. 423/393

FOREIGN PATENT DOCUMENTS 6155 of 1908 United Kingdom ................ 423/394
910131 11/1962 United Kingdom ................ 423/394

Primary Examiner—G. O. Peters

[57] ABSTRACT

There is described a process for the reconstitution of $NO_X$ gases produced by the thermal decomposition of metal nitrates to nitric acid comprising the steps of:

1. contacting the $NO_X$ gases in counter-current relationship in one or more packed columns with cooled 50 to 60 percent nitric acid to remove as nitric acid a major portion of the originally introduced $NO_X$ values and provide an acid solution leaving the column having a temperature below about 180° F. to remove as nitric acid a major portion of the originally introduced $NO_X$ values;
2. compressing the residual gases from step 1 to from about 2 to about 6 atmospheres absolute;
3. contacting the compressed gases from step 2 with from about 50 to about 60 percent nitric acid in a packed absorption column in counter-current relationship to remove substantially all of the remaining $NO_X$ values from the gas stream as $HNO_3$; and
4. recovering 50–60% nitric acid as it accumulates.

7 Claims, No Drawings

NITRIC ACID RECONSTITUTION

This application is a continuation-in-part of U.S. application Ser. No. 61,298, filed July 27, 1979, now abandoned.

FIELD OF THE INVENTION

The present invention relates to a process for recovering and reconstituting nitric acid in a nitric acid process for the extraction of alumina values from clay and more specifically to an improved method for reconstituting $NO_X$ gases produced in such a process.

BACKGROUND OF THE INVENTION

In order to provide an economically useful nitric acid extraction process for alumina, the nitric acid must be recovered from the total process in sufficient quantity as to provide a high percentage of acid recirculation. It is known in the art that substantial nitric acid may be recovered by direct condensation of $HNO_3$ in the decomposition step of such a process. Such recovery recycles about 67% of the nitric acid used in the process. However, substantial amounts of the acid exits other stages of the decomposition in the form of $NO_X$ gases.

The recovery of nitric acid solutions from nitrous gases produced by the catalytic combustion of ammonia in air is a well-known art that is practiced commercially around the world. The basic process comprises contacting the ammonia oxidation gases at a pressure of 3 to 6 atmospheres absolute, or even higher, in a bubble cap-tray absorption column containing on the order of a hundred trays in countercurrent relationship with a supply of water introduced at the top of the column. Variations of the technology are concerned substantially with design of the bubble cap trays, oxidation of the ammonia under pressure, or oxidation at about atmospheric pressure to reduce catalyst consumption followed by the compression of the cool gases, the recovery and re-use of the heat produced in the ammonia oxidation reaction, and recently methods of reducing the approximately 1,000 ppm $NO_X$ concentration in the tail gas before releasing this gas to the atmosphere.

The chemistry of the conversion of $NO_X$ gases to nitric acid in solution is generally considered as consisting of 2 overall reactions which serve to define the mass balance between the liquid and vapor streams. Reaction 1: $3NO_2(g) + H_2O(l) = 2HNO_3(aq) + NO(g)$ which occurs principally in the liquid phase and reaction 2: $2NO(g) + O_2(g) = 2NO_2(g)$ which occurs substantially in the gas phase. The rate of reaction 1 is thought to depend primarily upon the rate of absorption of $NO_2$ into the liquid stream which depends upon the partial pressure of $NO_2$ in the gas stream and is thus slowed down by the presence of large quantities of inert gases such as $N_2$, and concentrations of NO in the gas phase which tend to drive reaction 1 in the reverse direction. Once the $NO_2$ has been absorbed the reactions in the liquid phase appear to proceed at satisfactory rates. The rate of reaction 2 is proportional to the product of the square of the partial pressure of NO and the partial pressure of $O_2$ and can be quite slow in the presence of large amounts of inert gases such as $N_2$. In the ammonia oxidation process for making nitric acid the feed gases from the oxidizer comprise on the order of 70 volume percent $N_2$ and the proportion of $N_2$ increases as the $NO_X$ gases are absorbed from the gaseous stream. Additional $N_2$ is added with air to provide some oxygen in the tail gas to drive reaction 2 toward completion. Thus, although nitric acid has been recovered from ammonia oxidation gases at about atmospheric pressure using 2 or 3 absorption towers in series it has been found more economical to compress the gases to 3 to 6 atmospheres absolute so as to increase the partial pressure of the reacting gases sufficiently to permit carrying out the reconstitution in a single tall column.

The thermal decomposition of metal nitrates to oxides produces $NO_X$ gases together with at least the stoichiometric amount of $O_2$ required to convert the NOX gases to $HNO_3$. Decomposition of multivalent metal nitrates, for instance $Pb(NO_3)_2$, $Ca(NO_3)_2$, $UO_2(NO_3)_2$ $nH_2O$, $Al(NO_3)_3$ $nH_2O$, $Al(OH)_2NO_3$ $nH_2O$—produce the stoichiometric requirement of $O_2$, i.e., 1 mol of $O_2$ per 4 mols of $(NO + NO_2)$ plus $\frac{1}{2}$ mol $O_2$ per mol of any NO formed. Monovalent metal nitrates, such as $NaNO_3$, may yield more than enough $O_2$ because portions of the contained nitrogen values may be converted to $N_2$ gas during decomposition instead of $NO_X$. When the thermal decomposition is carried out in properly constructed, indirectly-heated decomposers that restrict the ingress of air, the $NO_X$ gases contain little or none of the inert $N_2$ and are therefore highly concentrated in reactive components. A typical composition of such an $NO_X$ gas resulting from the thermal decomposition of aluminum nitrate by a decomposition process is disclosed in co-pending U.S. Pat. application Ser. No. 61,297, shown in Table 1, Column 2, is 25 volume percent of $(NO + NO_2)$, 12.5 volume percent $O_2$ and 62.5 volume % $H_2O$. Since, in an absorption column, water vapor is absorbed into the liquid stream much more rapidly than $NO_X$, the concentration of the reacting gases increases during passage through the absorption column so that the same or even higher rates of Reactions 1 and 2 may be achieved as can be achieved with ammonia oxidation gases at elevated pressures.

Since both Reactions 1 and 2 are highly exothermic and the easily reversible Reaction 1 can begin converting $HNO_3$ from the acid solution to $NO_2$ in the gas at temperatures as low as 150° to 180° F., depending upon the concentration of $HNO_3$ in the liquid and of NO in the gas phase, the removal of heat from the absorption column is of major importance. It is known in the art to remove this heat either by placing water-cooled cooling coils in the liquid layer maintained on the upper side of the bubble cap trays or to withdraw a portion of the liquid from each of a number of trays in the column, pass the liquor through individual heat exchangers, and return it to the column after cooling. Plants handling ammonia oxidation gas typically provide sufficient cooling to the column by one or the other means so that the strong acid exiting the column is cooler than about 120° F., or even lower depending upon the strength of the nitric acid that is being manufactured.

In contrast to the recovery of nitric acid from ammonia oxidation gases there has been very little need around the world to recover nitric acid from concentrated $NO_X$ streams such as that described above for the decomposition of aluminum nitrate materials.

SUMMARY OF THE INVENTION

The $NO_X$ recovery process of the present invention comprises contacting $NO_X$ gases containing at most relatively small proportions of inert diluant gases such as $N_2$ in counter-current relation with a cooled 50-60% nitric acid solution in one or more packed columns operating at about or slightly below atmospheric pressure to remove as nitric acid a major portion, preferably 90% or more, of the originally-introduced $NO_X$ values, compressing the residual depleted gases to 2 to 6 or more atmospheres absolute, contacting the compressed gases in counter-current relation with the nitric acid solution in a packed tower to strip substantially all of the remaining nitric acid values from the gas stream, and recovering the acid produced as 50–60% nitric acid.

DETAILED DESCRIPTION

According to the present invention, the reconstitution of such $NO_X$ gases to nitric acid is most efficiently performed as follows:

$NO_X$ gases, produced by thermal decomposition of metal nitrates, especially aluminum nitrate, materials and consisting essentially of $NO_X$, $O_2$, and water vapor and possibly small amounts of $N_2$ from air in-leakage, are partially cooled and absorbed in recirculating cooled, 50 to 60% nitric acid solution from a common receiver tank in one or more packed absorption towers. Nitric acid gas is contacted in a first packed absorption tower operating around atmospheric pressure to 5–50 inches water column negative pressure in counter-current relationship to an amount of cooled nitric acid solution sufficient to keep the temperature of the acid solution leaving the column at below about 180° F., the unabsorbed gases exiting the tower are compressed to at least about 20 psig and preferably within a range of about 20 to about 100 psig and contacted in a second, pressurized packed absorption column in counter-current relationship with a quantity of the cooled 50–60% nitric acid solution sufficient to maintain the temperature of the liquor leaving the second column below about 150° F., preferably below about 130° F., and residual gases from the second tower are passed through a small absorber in counter-current relationship to a flow of a small amount of water to absorb excess HCl gases and then passed to suitable tail gas $NO_X$ recovery or destruction means before venting to the atmosphere.

Before contacting the gases in the said second, pressurized packed absorption column the $NO_X$ gases are blended with sufficient air to provide about 2–10 percent or more $O_2$ in the tail gas. This air may be introduced at any convenient location upstream of the second absorption column and is preferably introduced upstream of the first packed absorption tower.

The nitric acid solution is maintained within the range of about 50 to 60% acid, usually about 54 to 58%, by addition of acid and/or water as required and is supplied from one or more surge tanks, as may be desired, through heat exchangers to the individual packed columns at rates to each column such that the acid solution leaving the column is less than about 180° F. in temperature, preferably less than about 150° F. Liquid draining from the towers is collected in the surge tank for recirculation and the excess is drawn off as 50–60% product acid for use, for instance, for the digestion of alumina from calcined clay for the manufacture of aluminum nitrate in a process for the recovery of metallurgical grade alumina from clay. More specifically, according to a preferred method, concentrated $NO_X$ gases from aluminum nitrate decomposers are mixed with hot make-up $NO_X$ gases from an $NH_3$-oxidizer, pass through a waste heat boiler, wherein re-usable heat is extracted, and then blended with vent gases, and with air introduced through a flow control valve that is responsive to an oxygen meter. The mixed gases pass in to an open spray tower where they are counter-currently contacted with acid to remove a portion of the contained heat, water vapor, and $NO_2$ and then pass sequentially through one or more packed towers, in which they are counter-currently contacted with acid which has been cooled in a heat exchanger, and then compressed in a compressor to 2 to 6 or more atmospheres absolute pressure before passing through another packed tower in counter-current contact with cooled acid. The vapors are then passed through a bubble cap tower where they are contacted countercurrently with water to absorb HCl values that may be present and the remaining gases pass through an absorber for stripping out any residual $NO_X$ before exhausting to the atmosphere. Nitric acid solution draining from all of the towers is collected in a tank, in which the acid concentration is controlled to below 60%, or preferably below about 58%, by means of the addition of relatively strong acid and/or water from other acid and heat recovery operations in the plant.

The reaction towers are packed absorption columns wherein the packing may be any desired commercially available packing material which preferably has a large void volume per unit of surface area such as is true of Raschig rings. The large void volume of, for instance, Raschig rings minimizes the velocity of flow of the gas through the packing, thereby providing gas residence time for the relatively slow Reaction 2 to proceed. This reaction time would have to be provided by increasing the height of the tower if packing with a lower void volume were provided. Such rings also simultaneously provide a large gas-liquid contact area which in well known manner facilitates the absorption of $NO_2$ into the liquid and desorption of the reaction product NO from the liquid.

Void volumes for a number of packing materials are available in "Chemical Engineers Handbook" fifth Edition edited by Perry and Chilton—McGraw-Hill Publishing Company, New York, N.Y.; Section 18: Gas-Liquid Contacts. This section also discusses the relative efficiencies of various packing materials for absorption of gases into liquids and presents methods of estimating absorption rates, heat-transfer rates, pressure drops, etc. Data also may be obtained from packing manufacturers and from other well-known publishing sources.

As mentioned hereinabove, plate-type absorption columns generally are used for absorption of $NO_X$ from gases produced by oxidation of $NH_3$ with air to obtain the maximum possible void volume, and gas residence time wherein Reaction 2 may proceed substantially to completion. For the concentrated gases addressed herein, however, an even more important requirement is the extraction of sensible heat from the gas phase produced therein by the exothermic Reaction 2, whereby the temperature rise of the gas phase, with the attendant rapid decrease in the rate of Reaction 2, is minimized. Packed towers are much more efficient for the removal of this sensible heat than tray-type towers, and in addition evaporation of water and acid from the myriads of small droplets dispersed in the gas phase further assists in minimizing the gas temperature rise thereby permitting use of much smaller equipment than would be necessary with tray-towers.

The following examples are intended to better describe and more clearly point out the advantages and preferred manipulative steps of each of the steps of the process of the instant invention.

The following technique is applied in the processes of the following examples:

Concentrated $NO_X$ gases from aluminum nitrate decomposers are mixed with hot make-up $NO_X$ gases from an $NH_3$-oxidizer, pass through a waste heat boiler, wherein re-usable heat is extracted, and then blended with vent gases and air. The mixed gases pass into an open spray tower where they are counter-currently contacted with acid from a tank to remove a portion of the contained heat, water vapor, and $NO_2$ and then pass sequentially through two packed towers, in which they are counter-currently contacted with acid from said tank which has been cooled, and then compressed in a compressor to 2 to 6 or more atmospheres absolute pressure before passing through a third packed tower in counter-current contact with cooled acid from said tank. The gases are then passed through a bubble cap tower where they are contacted counter-currently with water to absorb HCl values that may be present and the remaining gases pass through a $NO_X$ absorber for stripping out any residual $NO_X$ before exhausting to the atmosphere. Nitric acid solution draining from all four of the towers is collected in said tank in which the acid concentration is controlled to below 60%, or preferably below about 58%, by means of the addition of relatively strong acid and/or water and product acid is withdrawn from said tank as it accumulates.

EXAMPLE 1

Feed gas having an estimated rate (in pound mols per hour) and temperature shown in Column 2 of Table 1 is mixed with makeup gas from an atmospheric pressure $NH_3$-oxidation unit at a rate shown in Column 3, Table 1 and passed through a waste-heat boiler in which heat is extracted and is blended with air from Column 4, Table 1 to produce an assumed column feed gas as given in Column 5, Table 1.

Since heat exchangers for cooling gases are larger and more expensive than those for cooling liquids, the gases are cooled only to about 250° F. and no water is condensed in the waste heat boiler.

Since the column feed gases will reconstitute to about 64% nitric acid, an unnecessarily-high concentration that would increase unduly the difficulty of absorption and reconstitution, about 191 tons per hour of about 54% nitric acid solution are fed to the product holding tank. Such addition alone maintains the concentration in the product tank at about 56.9%, a satisfactorily low value. In addition about 9.4 tons of dilution water are added to maintain the mean concentration in the tank at about 55% nitric acid.

About 289 tons per hour of 55% nitric acid accumulates in the product holding tank by virtue of the additions of acid and water and the $NO_X$ reconstitution operations to be described and is withdrawn as product acid and recycled to a leaching operation to produce aluminum nitrate.

EXAMPLE 2

The column feed gas from Example 1 is introduced to a first packed tower, which comprises 160 square feet of internal cross-section area, about 14.3 feet inside diameter, and is packed with 2-inch metal Raschig rings. The tower is fed with about 4565 GPM of acid solution which is cooled to about 100° F. and which is distributed over the packing and drains through the packing in counter-current relation to the rising feed gas. The liquid absorbs nitric acid and water (and a little $NO_2$) from the feed gas and drains from the column at a rate of about 4810 GPM at a temperature of about 175° F. At the gas and liquid rates existing at the base of the packing, the pressure drop is about 1.5 inches water column per foot of packing, just below flooding conditions, but the absorption rate of $NO_2$, and particularly $H_2O$, is so rapid that the gas volume decreases to about ½ of the initial volume within about a foot of effective packing height, whereby the pressure drop is reduced to well below that required for flooding.

At a level in the column corresponding to about 12½ feet of fully-effective packing over 90% of the feed $NO_X$ values have been absorbed and the gas flow rate and composition is that given in Column 2, Table 2. Both reactions (1) and (2) are continuing but at reduced rates.

At a column height equal to about 24 feet of fully-effective packing the gas rate and composition is that given in Column 3, Table 2.

EXAMPLE 3

The gas from the 12¾ ft. effective packing height of Example 2 is compressed to 3.0 atmospheres absolute and fed into a packed absorption column. The packed column has an inside cross-sectional area of 53.6 square feet, inside diameter about 8.26 feet, and is fed with about 1200 GPM of 55% acid cooled to about 114° F. which absorbs acid, heat and water vapor from the gas during counter-current contact in the packing so that the liquid draining from the column comprises about 1213 GPM at a temperature of about 130° F. The column is packed with 2-inch Raschig rings.

Because of the high partial pressures of both NO and $O_2$ in the compressed gas, NO is oxidized to $NO_2$ by Reaction 2 at a rate of nearly 5 pound moles NO per hour per cubic foot of void volume, with an attendant high rate of heat release to the gas. Since the rate of Reaction 2, which is very important in this column, is inhibited by high gas temperatures it is desirable to use a liquid seal of cool acid in the compressor, and to make the compressor to column connection relatively short so that oxidation occurs mainly within the column where the gas is cooled by contact with the liquid and liquid spray.

The quantities of $NO_X$ remaining, including minor amounts of $NO_2O_3$ and $N_2O_4$, and $HNO_3$ vapors, at column heights equivalent to the listed packing height in feet of fully effective packing are given in Table 3.

If the system feed gas contains HCl in excess of the small amounts soluble in 55% nitric acid, the off-gas from the selected effective packing height of the column is passed through a mist eliminator to another column wherein it is contacted in counter-current relation with 200 to 300 pounds per hour of water, as needed to keep the concentration of the weak acid exiting below about 25 wt.% total acid, whereby the HCl and $HNO_3$ vapors are absorbed along with minor amounts of the contained $NO_X$ values. The absorption, as $HNO_3$, of the $NO_X$ values is minimized by limiting the number of trays and the gas residence time to the minimum values required for proper design for absorbing the very-easily-absorbed HCl. It is known to treat the HCl-containing liquid with ozone to convert the HCl to $Cl_2$ gas, which is removed and absorbed in caustic liquor, and return the HCl-free acid to the process.

The tail gas exits the column through a mist eliminator, passing an $O_2$ concentration sensor, to an $NO_X$ stripping unit which is preferably a proprietary Pura Siv N unit manufactured for sale to the industry by Union Carbide Corporation, New York, N.Y., that is known to strip the $NO_X$ concentration to 50 ppm or less and permit recycling of the recovered $NO_X$ to the reconstitution system (U.S. Pat. No. 3,473,893, Hardison).

It is also known to catalytically reduce the $NO_X$ to $N_2$ with ammonia or methane or to absorb the $NO_X$ in nitric acid solutions from which all residual $NO_X$ has been stripped by treatment with hot air in a stripping column. Acid offered for commercial sale usually has been bleached, that is, stripped in such manner.

The stripped tail gas is then exhausted to the atmosphere through, if desired, recovery means well known to the industry.

EXAMPLE 4

The gas from the 24 foot effective packing height of Example 2, listed in Column 3 of Table 2, is compressed to 6.0 atmospheres absolute pressure and contacted in a 12.6 square foot inside area, 4 foot inside diameter, column packed with 2 inch Raschig rings and supplied as in Example 3 with about 280 GPM of 55% acid solution at about 104° F. which, after absorbing heat, nitric acid and water vapor, exits the column at about 130° F. The $NO_X$ and $HNO_3$ contents of the residual gas at various effective packing heights are listed in Table 4. The gas exiting the column through the mist eliminator is treated as described in Example 3.

EXAMPLE 5

Examples 2–4 show the use of a single atmospheric-pressure absorption column ahead of the high-pressure column. This example shows the use of a short, larger-diameter atmospheric pressure column for removing the bulk of the water from the gases followed by absorption in a taller, smaller-diameter atmospheric pressure column to complete absorption of 90% or more of the $NO_X$ in the column feed gas (Table 1, Column5).

The column feed gas (Table 1, Column 5) is absorbed in a first column of 160 square feet cross-sectional area packed with 6½ feet effective depth of 2 inch Raschig rings supplied with about 4585 GPM of acid liquor cooled to about 100° F., yielding a liquid effluent of about 4810 GPM at about 162° F. Residual gas exiting at the top of this column is fed to an atmospheric pressure column which comprises a 7 ft. inside diameter column packed with 2-inch Raschig rings supplied through a sprayer with about 845 GPM of acid cooled to about 100° F.

At a column height corresponding to about 15 feet of effective packing height the gas composition and heat content are essentially the same as those obtained in Example 2 for 12½ feet of effective packing (Table 2, Column 2). Upon comparison of the total volumes of effective packing it is seen that the 2-column combination saves about 400 cubic feet of effective packing volume over the single, large diameter column of Example 2.

Similarly it is found that at an effective packing height of about 47 feet in the 7-foot diameter column the gas conditions essentially match those of Table 2, Column 3 for the 24-foot packing height of Example 2. The savings for this variation is about 980 cu. ft. of effective packing volume.

TABLE 1

RATE - POUND MOLS/HOUR

| COMPONENT | FEED GAS | MAKE UP | BLEED AIR | ASSUMED COLUMN FEED |
|---|---|---|---|---|
| NO | 817.3 | 60.7 | — | 169.5 |
| $NO_2$ | 817.3 | — | — | 1525.8 |
| $O_2$ | 817.3 | 40.9 | 67.8 | 571.8 |
| $H_2O$ | 4086.6 | 100.6 | 2.7 | 4189.9 |
| $N_2$ | 0 | 452.9 | 256.6 | 709.5 |
| Temperature, °F. | 600 | 1000 | 77 | 250 |
| Pressure, Atm. Abs. | 0.95 | 1 | 1 | 0.948 |

TABLE 2

FLOW - POUND MOLS/HOUR

| GAS COMPONENT | 12½ FT. PACKING | 24 FT. PACKING |
|---|---|---|
| NO | 127.5 | 43.1 |
| $NO_2$ | 27.3 | 10.1 |
| $N_2O_3$ | 0.21 | 0.09 |
| $N_2O_4$ | 0.24 | 0.17 |
| $O_2$ | 166.0 | 99.1 |
| $H_2O$ | 29.4 | 21.8 |
| $HNO_3$ | 3.1 | 2.3 |
| $N_2$ | 709.5 | 709.5 |

TABLE 3

RATE - POUND MOLS/HOUR IN GAS

| EFFECTIVE PACKING HEIGHT Ft. | NOX | HNO3 | CONC. NOX, PPM | LOSS, % OF $NO_X$ FEED (COLUMN 5, TABLE 1) |
|---|---|---|---|---|
| 19.5 | 6.12 | 0.83 | 7700 | 0.41 |
| 23 | 5.28 | 0.83 | 6700 | 0.36 |
| 33 | 4.03 | 0.82 | 5100 | 0.29 |

O2 Concentration 8.4 to 8.3 Volume %.

TABLE 4

FLOW - POUND MOLS/HOUR

| EFFECTIVE PACKING HEIGHT Ft. | NOX HNO3 | $NO_X$, PPM | CONC. TABLE 1) | LOSS, % OF NOX FEED (COLUMN 5, |
|---|---|---|---|---|
| 9 | 5.53 | 0.31 | 7050 | 0.34 |
| 15 | 3.29 | 0.29 | 4200 | 0.21 |
| 20 | 2.47 | 0.29 | 3200 | 0.16 |
| 30 | 1.74 | 0.28 | 2250 | 0.12 |

We claim:

1. A process for the reconstitution of $NO_X$ gases produced by the thermal decomposition of metal nitrates to nitric acid comprising the steps of:
   a. contacting the $NO_X$ gases at atmospheric pressure or 5–50 inches of water negative pressure in counter-current relationship in one or more packed columns with 50 to 60 percent nitric acid solution cooled sufficiently to provide acid solution exiting said one or more columns at a temperature below about 180° F. to remove as nitric acid, a major portion of the originally introduced $NO_X$ values;
   b. compressing the residual gases from step a to at least about 2 atmosphere absolute;
   c. contacting the compressed gases from step b in a pressurized packed column with from about 50 to about 60% nitric acid to remove the residual $NO_X$ values from the gas as $HNO_3$; and d. recovering nitric acid as it accumulates.

2. A process for the reconstitution of $NO_X$ gases produced by the thermal decomposition of aluminum nitrates to nitric acid comprising the steps of:
   a. contacting the $NO_X$ gases at atmospheric pressure or 5–50 inches of water negative pressure in a counter-current relationship in one or more packed columns with 50 to 60 percent nitric acid solution cooled sufficiently to provide acid solution existing said one or more columns at a temperature below about 180° F. to remove, as nitric acid, a major portion of the originally introduced $NO_X$ values;
   b. compressing the residual gases from step (a) to at least about 2 atmosphere absolute;
   c. contacting the compressed gases from step (b) in a pressurized packed column with from about 5 to about 60% nitric acid to remove the residual $NO_X$ values from the gas as $HNO_3$; and
   d. recovering nitric acid as it accumulates.

3. The process of claim 1 or claim 2 wherein said $NO_X$ gases are blended with sufficient air to provide between about 2 and about 10 percent oxygen in the tail gas prior to contacting with nitric acid in step (c).

4. The process of claim 1 or claim 2 wherein said packed columns are operated at a pressure ranging from about atmospheric pressure to about 50 inches of water negative pressure.

5. The process of claim 1 or claim 2 wherein the compression of step (b) is within the range of from about 2 to about 6 atmosphere absolute.

6. The process of claim 1 or claim 2 wherein the contacting nitric acid of step (c) is cooled sufficiently that the temperature of the acid exiting the column is below about 150° F.

7. The process of claim 1 or claim 2 wherein step (a) is operated to remove as nitric acid at least about 90% of the originally introduced $NO_X$ values.

* * * * *